(12) United States Patent
Hunter

(10) Patent No.: US 9,347,365 B2
(45) Date of Patent: *May 24, 2016

(54) AIR TURBINE DRIVEN EGR PUMP FOR DIESEL ENGINES

(71) Applicant: AVL Powertrain Engineering, Inc., Plymouth, MI (US)

(72) Inventor: Gary Hunter, Dexter, MI (US)

(73) Assignee: AVL Powertrain Engineering, Inc., Plymouth, MN (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/264,164

(22) Filed: Apr. 29, 2014

(65) Prior Publication Data

US 2014/0230800 A1     Aug. 21, 2014

Related U.S. Application Data

(62) Division of application No. 12/785,071, filed on May 21, 2010, now Pat. No. 8,726,657.

(60) Provisional application No. 61/180,486, filed on May 22, 2009.

(51) Int. Cl.
| | |
|---|---|
| *F02B 33/44* | (2006.01) |
| *F02B 29/04* | (2006.01) |
| *F02B 37/00* | (2006.01) |
| *F02B 37/16* | (2006.01) |
| *F02M 25/07* | (2006.01) |

(52) U.S. Cl.
CPC .............. *F02B 29/04* (2013.01); *F02B 37/00* (2013.01); *F02B 37/164* (2013.01); *F02M 25/0707* (2013.01); *F02M 25/0711* (2013.01); *F02M 25/0722* (2013.01); *F02M 25/0732* (2013.01); *Y02T 10/121* (2013.01); *Y02T 10/144* (2013.01)

(58) Field of Classification Search
CPC ........ F02B 29/04; F02B 37/00; F02B 37/164; F02M 25/0707; F02M 25/0711; F02M 25/0722
USPC ...................... 60/605.2, 624, 605.1
See application file for complete search history.

(56) References Cited

U.S. PATENT DOCUMENTS

| 7,591,131 B2 | 9/2009 | Easley, Jr. et al. |
| 8,726,657 B2* | 5/2014 | Hunter .................... F02B 37/00 60/605.1 |

OTHER PUBLICATIONS

U.S. Appl. No. 12/785,095, "Exhaust Power Turbine Drive EGR Pump for Diesel Engines," filed May 21, 2010.
Southwest Research Institute, "Low Emissions Potential of EGR-SCR-DPF and Advanced Fuel Formulations—A Progress Report," Oct. 2002.

* cited by examiner

*Primary Examiner* — Ching Chang
(74) *Attorney, Agent, or Firm* — Harness, Dickey & Pierce, P.L.C.

(57) ABSTRACT

A power plant is provided and may include an exhaust gas recirculation passage and a turbo machine having a first turbine rotationally coupled to a pump. The first turbine may include an expanded air passage. The pump may be arranged in the exhaust gas recirculation passage. A pre-cooler may be arranged in the expanded air passage and in the exhaust gas recirculation passage upstream from the pump.

19 Claims, 1 Drawing Sheet

AIR TURBINE DRIVEN EGR PUMP FOR DIESEL ENGINES

CROSS-REFERENCE TO RELATED APPLICATIONS

This application is a divisional of U.S. patent application Ser. No. 12/785,071 filed on May 21, 2010. This application claims the benefit of U.S. Provisional Application No. 61/180,486 filed on May 22, 2009. The entire disclosures of each of the above applications are incorporated herein by reference.

FIELD

The present disclosure relates to turbo diesel engines having exhaust gas recirculation.

BACKGROUND

This section provides background information related to the present disclosure which is not necessarily prior art.

Large diesel engines are used in locomotive and off-road applications. Diesel engines for these applications are in the range of 1-5 megawatts, for example. It is desirable to recirculate the exhaust gases into the charge air stream to reduce the emissions of the diesel engine.

The intake manifold pressure of large diesel engines is typically higher than the exhaust manifold pressure. As a result, the exhaust gases must be pumped into the charge air to recirculate the exhaust gases. Electric motors are typically used to drive the exhaust gas recirculation pump. Electric motors can be difficult to package and may result in a fuel consumption penalty for the overall efficiency of the diesel engine.

SUMMARY

This section provides a general summary of the disclosure, and is not a comprehensive disclosure of its full scope or all of its features.

A power plant is provided and may include an exhaust gas recirculation passage and a turbo machine having a first turbine rotationally coupled to a pump. The first turbine may include an expanded air passage. The pump may be arranged in the exhaust gas recirculation passage. A pre-cooler may be arranged in the expanded air passage and in the exhaust gas recirculation passage upstream from the pump.

In another configuration, a power plant is provided and may include an engine and a first turbo machine having a first turbine rotationally coupled to a compressor. The first turbine may receive exhaust gas from the engine and may produce compressed air. The power plant may additionally include a second turbo machine having a second turbine rotationally coupled to a pump. The second turbine may receive the compressed air from the first turbo machine and may produce expanded air. A pre-cooler may be arranged downstream from the second turbine and upstream from the pump and may receive the expanded air from the second turbine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figures 1, 2:
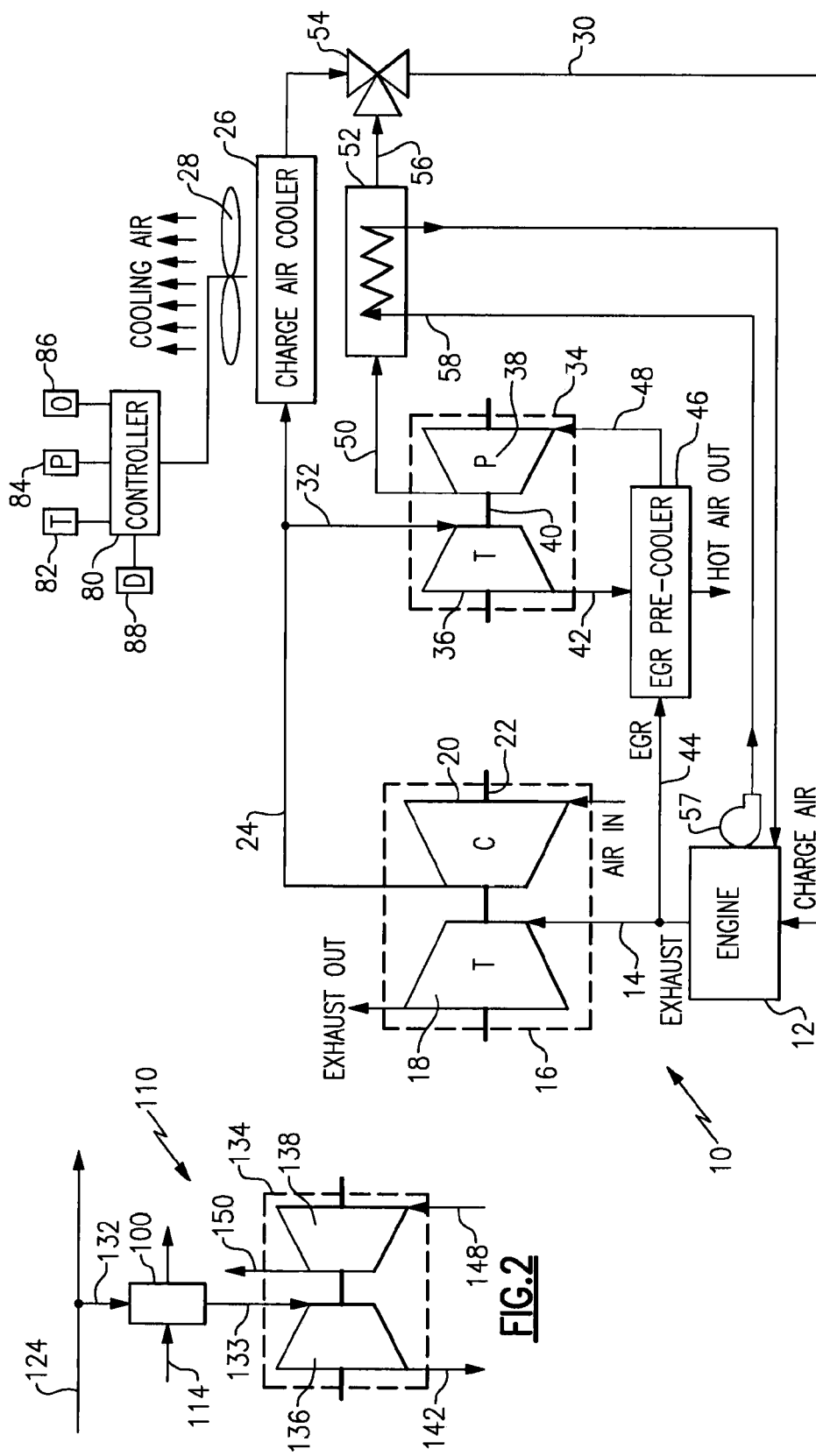
FIG. 1 is a schematic view of an example powertrain system using exhaust gas recirculation.
FIG. 2 is a schematic illustrating the use of an exhaust-to-air heat exchanger in the powertrain system illustrated in FIG. 1.

Example embodiments will now be described more fully with reference to the accompanying drawings.

A power plant 10 includes an engine 12, which may be a large diesel engine. The engine 12 expels exhaust gases through an exhaust passage 14, which includes an exhaust manifold. The exhaust gases in the exhaust passage 14 drive a turbo machine 16. More specifically, the exhaust gases rotationally drive a first turbine 18 that is coupled to a shaft 22. A compressor 20 is coupled to the shaft 22 and is rotationally driven by the turbine 18 as the exhaust gases expand within the first turbine 18. The first turbine 18 may have a fixed geometry, variable geometry and/or a wastegate.

Intake air is received by the compressor 20, which produces compressed air or charge air. The compressed air exits the compressor 20 through a charge air passage 24 at about 200.degree. C. in one example. The compressed air flows through a cooler 26 arranged in the charge air passage 24, which cools the compressed air by blowing air across the cooler 26 with a cooling fan 28. A controller 80 is programmed to selectively energize the fan 28 in response to inputs from temperature 82, pressure 84 and/or other sensors 86, for example, to regulate the temperature of the charge air at a predetermined condition arranged in the charge air passage 24. Cooled charge air from the cooled charge air passage 30 is provided to the intake manifold of the engine 12, which is schematically indicated by the arrowhead into the bottom of the engine 12 in FIG. 1.

In the example power plant 10, a portion of compressed air is provided through passage 32 to a second turbo machine 34. The second turbo machine 34 includes a second turbine 36 and a pump 38 coupled to a shaft 40. As the portion of compressed air 32 expands within the turbine 36, the pump 38 is rotationally driven. A flow control valve (not shown) may be arranged in the line providing the portion of compressed air to regulate the EGR flow rate. Alternatively or additionally, the second turbine 36 includes a variable geometry to regulate the flow therethrough. Expanded air exits the turbine 36 through expanded air passage 42 at approximately 100.degree. C. The expanded air enters an optional EGR precooler 46, which receives EGR 44 from the exhaust 12. An engine coolant-to-exhaust heat exchanger may be used in place of the EGR pre-cooler 46, for example. The EGR is typically 500-600.degree. C. The expanded air cools the EGR 44 to approximately 400-450.degree. C. before the pre-cooled EGR 48 enters the pump 38.

Pumped EGR through pumped EGR passage 50 enters an EGR cooler 52 where it is cooled by a coolant in a coolant loop 58. The coolant 58 is a liquid coolant, which may be provided from the engine 12 by coolant pump 57, for example. Engine coolant typically is approximately 90.degree. C. Cooled EGR 56 enters a mixer 54, which is arranged in the cooled charge air 30 stream. In this manner, EGR is pumped to the charge air, which is returned to the intake manifold of the engine 12.

In another example power plant 110 shown in FIG. 2 Like numerals are used to indicate like elements between the Figures. A portion of compressed air in passage 132 is provided to the second turbo machine 134. The second turbo machine 134 includes second turbine 136 and pump 138. The expanded air exits the second turbine 136 through the expanded air passage 142. A heat exchanger 100 is arranged in the exhaust passage 114 and the passage 132 to heat the charge air before entering the second turbine 136 through heated charge air passage 133.

The controller 80 may also be programmed to regulate other devices 88, such as flow control valves and fans, to regulate the temperature of the fluids within the power plant 10, for example, using a flow control valve in the passage 32.

Although an example embodiment has been disclosed, a worker of ordinary skill in this art would recognize that certain modifications would come within the scope of the claims. For that reason, the following claims should be studied to determine their true scope and content.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power plant comprising:
   an exhaust gas recirculation passage;
   a first turbo machine including a first turbine rotationally coupled to a pump, the first turbine having an expanded air passage, and the pump arranged in the exhaust gas recirculation passage; and
   a pre-cooler arranged in the expanded air passage and in the exhaust gas recirculation passage upstream from the pump.

2. The power plant according to claim 1, further comprising an engine coupled to the first turbo machine.

3. The power plant according to claim 2, wherein the engine includes a coolant loop and the pump includes a pumped EGR passage.

4. The power plant according to claim 3, further comprising an EGR cooler arranged in the pumped EGR passage and the coolant loop.

5. The power plant according to claim 2, further comprising a second turbo machine coupled to the engine, the second turbo machine including a second turbine and a compressor.

6. The power plant according to claim 5, wherein the second turbine is arranged in an exhaust passage of the engine and is configured to be driven by the exhaust and rotationally drive the compressor.

7. The power plant according to claim 6, wherein the compressor is configured to produce charge air.

8. The power plant according to claim 1, further comprising an engine having an intake manifold and a charge air passage in fluid communication with the intake manifold and configured to supply charge air to the engine.

9. The power plant according to claim 8, further comprising an exhaust passage in fluid communication with the engine, the exhaust passage configured to receive engine exhaust and the exhaust gas recirculation passage configured to receive a portion of the engine exhaust.

10. The power plant according to claim 9, further comprising a second turbo machine including a second turbine and a compressor.

11. The power plant according to claim 10, wherein the second turbine is arranged in the exhaust passage and is configured to be driven by the exhaust and rotationally drive the compressor.

12. The power plant according to claim 11, wherein the compressor is configured to produce the charge air.

13. A power plant comprising:
    an engine;
    a first turbo machine including a first turbine rotationally coupled to a compressor, the first turbine receiving exhaust gas from the engine and producing compressed air;
    a second turbo machine including a second turbine rotationally coupled to a pump, the second turbine receiving the compressed air from the first turbo machine and producing expanded air; and
    a pre-cooler arranged downstream from the second turbine and upstream from the pump, the pre-cooler receiving the expanded air from the second turbine.

14. The power plant according to claim 13, further comprising an exhaust gas recirculation passage.

15. The power plant according to claim 14, wherein the pump is arranged in the exhaust gas recirculation passage.

16. The power plant according to claim 15, wherein the pre-cooler is arranged in the exhaust gas recirculation passage.

17. The power plant according to claim 14, wherein the pre-cooler is arranged in the exhaust gas recirculation passage.

18. The power plant according to claim 13, wherein the engine includes a coolant loop and the pump includes a pumped EGR passage.

19. The power plant according to claim 18, further comprising an EGR cooler arranged in the pumped EGR passage and the coolant loop.

* * * * *